United States Patent [19]

Ward

[11] Patent Number: 4,585,088

[45] Date of Patent: Apr. 29, 1986

[54] ARTICULATED ROAD VEHICLE WITH ENGINE SPACED REARWARDLY OF DRIVEN WHEELS

[76] Inventor: David F. Ward, 9 Honeypot Lane, Brentwood, Essex, England

[21] Appl. No.: 636,391

[22] Filed: Jul. 31, 1984

[30] Foreign Application Priority Data

Aug. 12, 1983 [GB] United Kingdom ................. 8321718

[51] Int. Cl.⁴ .............................................. B60K 7/00
[52] U.S. Cl. ...................................... 180/295; 180/58
[58] Field of Search ..................... 180/55, 58, 292, 295

[56] References Cited

U.S. PATENT DOCUMENTS

| | | | |
|---|---|---|---|
| Re. 28,675 | 1/1976 | Hobbensiefken | 180/295 |
| 1,975,366 | 10/1934 | Linderman | 180/58 |
| 2,013,599 | 9/1935 | Butler | 180/295 |
| 3,075,601 | 1/1963 | Muller | 180/295 |
| 3,115,206 | 12/1963 | Renner | 180/292 |
| 3,219,138 | 11/1965 | Kishline | 180/292 |
| 4,258,820 | 3/1981 | Miura et al. | 180/295 |

FOREIGN PATENT DOCUMENTS

| | | | |
|---|---|---|---|
| 1173808 | 7/1964 | Fed. Rep. of Germany | 180/55 |
| 792936 | 4/1958 | United Kingdom . | |
| 806939 | 1/1959 | United Kingdom . | |
| 827113 | 2/1960 | United Kingdom . | |
| 905712 | 9/1962 | United Kingdom . | |
| 1200191 | 7/1970 | United Kingdom . | |
| 1475822 | 6/1977 | United Kingdom . | |
| 2126542 | 3/1984 | United Kingdom . | |

*Primary Examiner*—Albert J. Makay
*Assistant Examiner*—Steven E. Warner
*Attorney, Agent, or Firm*—Klarquist, Sparkman, Campbell, Leigh & Whinston

[57] ABSTRACT

The tractor unit of an articulated, freight-carrying road vehicle has two rear axles, one of which is driven by an engine mounted rearwardly of the driven axle. The axis of the fifth wheel coupling to the trailer is situated forwardly of the driven axle so that the center of gravity of the tractor unit is in the vicinity of or is to the rear of the fifth wheel axis. The engine is connected at its rear end with a chassis of the tractor unit and is supported by the rear axles so that the engine moves relative to the chassis when the rear axles move relative to the chassis.

3 Claims, 3 Drawing Figures

ARTICULATED ROAD VEHICLE WITH ENGINE SPACED REARWARDLY OF DRIVEN WHEELS

BACKGROUND OF THE INVENTION

In my British Pat. No. 1,475,822 published June 10th 1977, there is proposed an articulated road vehicle having an engine mounted on a tractor unit of the vehicle at a position to the rear of the axis of a fifth wheel coupling between the tractor unit and a semi-trailer unit. I included in the aforesaid specification a diagrammatic representation of a tractor unit having a chassis, a driven rear axle and a further rear axle to the rear of the driven axle. I further represented diagrammatically an engine disposed partly between wheels of the non-driven rear axle and connected by a shaft with a differential housing of the driven axle.

In known tractor units for articulated vehicles of the general kind disclosed in the aforesaid specification, a unit comprising the engine and a gearbox is mounted by means of resilient mountings on a chassis of the tractor unit, is spaced significantly along the tractor unit from the driven axle and is connected with a differential of the driven axle by a shaft incorporating universal joints. While this arrangement is suggested by the diagrammatic representations in the aforesaid specification, I have found that the suggested arrangement can be improved by supporting the engine and gearbox unit on the rear axles, rather than supporting the engine and gearbox unit entirely on the chassis of the tractor unit.

Supporting of a vehicle engine and gearbox on an axle of the vehicle has been proposed in the prior art. British Pat. No. 291,251 Budge discloses a passenger car having a front axle connected by leaf springs with a chassis of the vehicle. A unit comprising an engine and a gearbox is supported at one end of the unit on the front axle and at the other end of the unit on the chassis by means of a ball and socket joint. This joint permits the engine and gearbox unit to tilt laterally with the front axle relative to the chassis.

In U.S. Pat. No. 3,115,206 of Renner and in German Pat. No. 1,917,563 of Rosenkrands, there is proposed an arrangement similar to that of Budge for the rear of a passenger car. These patents disclose an engine and gearbox unit which is rigidly connected with an axle and is connected with a chassis by a linkage which permits lateral tilting of the engine with the axle relative to the chassis. In each vehicle proposed in these patents, the engine projects rearwardly from the rearmost axle of the vehicle. It has been found that this arrangement impairs stability of the vehicle, particularly in unusual circumstances, for example when the vehicle skids laterally.

U.S. Pat. No. 1,975,366 of Linderman discloses a four-wheeled motor vehicle having a chassis and further having a sub-frame which carries the vehicle engine. The sub-frame is connected at its front end with the vehicle chassis by leaf springs and is connected at its rear end with the chassis by means of a further leaf-spring. Accordingly, the engine is free to move on the leaf-springs of the sub-frame relative to the chassis of the vehicle.

The particular arrangement proposed in the aforementioned prior art for passenger cars are clearly not useful in modern road vehicles intended for carrying large amounts of freight and do not enable the weight distribution proposed in my aforesaid British patent to be achieved in an articulated, freight carrying road vehicle.

In U.S. Pat. No. 2,013,599 of Butler, there is discloased a motor vehicle having a chassis and a driven axle which is connected with the chassis by means of a flexible sub-frame. A rigid unit comprising the engine and gearbox is connected at one of its ends directly with the differential housing of the driven axle and is connected at its opposite end with the flexible subframe. Accordingly, both the driven axle and the engine participate in movement of the sub-frame relative to the chassis and movement of the engine relative to the driven axle is avoided.

A tractor unit of an articulated motor vehicle is disclosed in U.S. Pat. No. Re. 28675 of Hobbensiefken. This tractor unit has a single rear axle and the patent emphasizes that the provision of a third axle is avoided. A sub-frame on which are mounted an engine, a gearbox and the driven rear axle is connected with a chassis of the vehicle by a hitch. The engine and gearbox form a unit which is disposed forwardly of the driven axle and is connected therewith by a shaft incorporating universal joints. The Hobbensiefken patent teaches that central mounting of the engine and related components substantially increases pay load capacity by improving weight distribution.

SUMMARY OF THE INVENTION

The present invention provides an articulated, freight-carrying road vehicle comprising a tractor and a semi-trailer, wherein the tractor has a chassis, steerable front wheels mounted on the chassis, first and second sets of rear wheels mounted for rotation about respective axes which are spaced apart along the chassis, an engine, transmission means for transmitting drive from the engine to at least the wheels of said first set, suspension means for transmitting a downwardly directed load from the chassis to the wheels of said sets while permitting limited upward and downward movement of said axes relative to the chassis and a fifth wheel coupling assembly on the chassis, wherein the engine is disposed partly between the wheels of said second set, the engine is spaced rearwardly from the axis of the wheels of said first set, there is provided at a rear end of the engine means for connecting the engine with the chassis at a position to the rear of the engine and in a manner to permit limited upward and downward movement of a front end of the engine relative to the chassis and means is provided for so connecting the engine with wheels of the first set that a substantially fixed relation is maintained between the engine and the axis of the wheels of the first set.

Connection of the engine with the driven wheels of the first set by means which maintains a substantially fixed relation between the engine and the axis of these wheels makes possible the provision of transmission means including a clutch unit and gearbox which are rigid with the engine, an axle unit for the wheels of the first set incorporating a differential gear and a relatively simple connection between the gearbox and the differential gear, a casing of the gearbox being formed integrally with or secured directly to or spaced only a short distance from a casing of the differential gear.

The vehicle tractor preferably further comprises a rear axle formed as an arch and extending over the engine-gear box unit between wheels of the second set.

In the preferred vehicle, said means for connecting the engine with the chassis includes means for restraining pivotal movement of the engine relative to the chassis about an axis extending longitudinally of the tractor and said means for connecting the engine with the wheels of the first set includes means for accommodating rocking of the axis of said first set of wheels relative to the engine about an axis extending longitudinally of the tractor.

Figure 1:
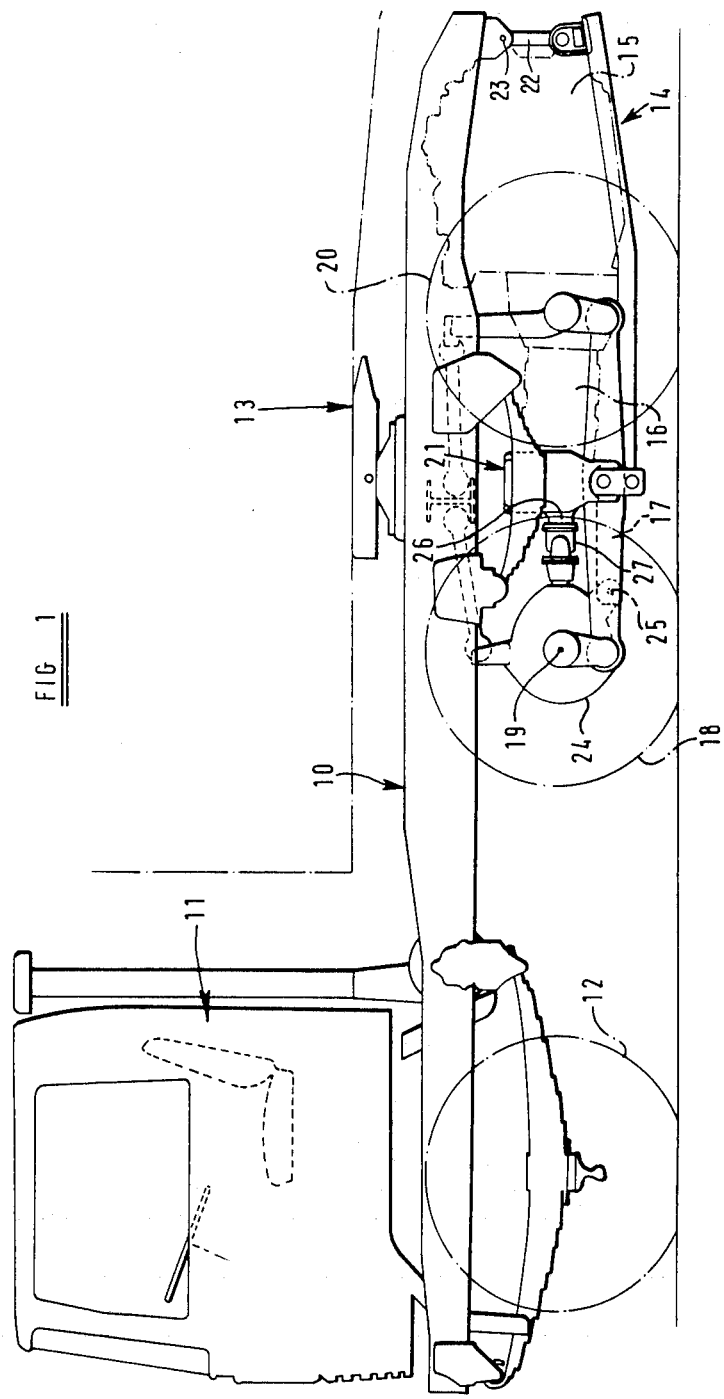
FIG. 1 shows a side elevation of a tractor and a part of a semi-trailer of an articulated vehicle embodying the invention.
Figure 2:
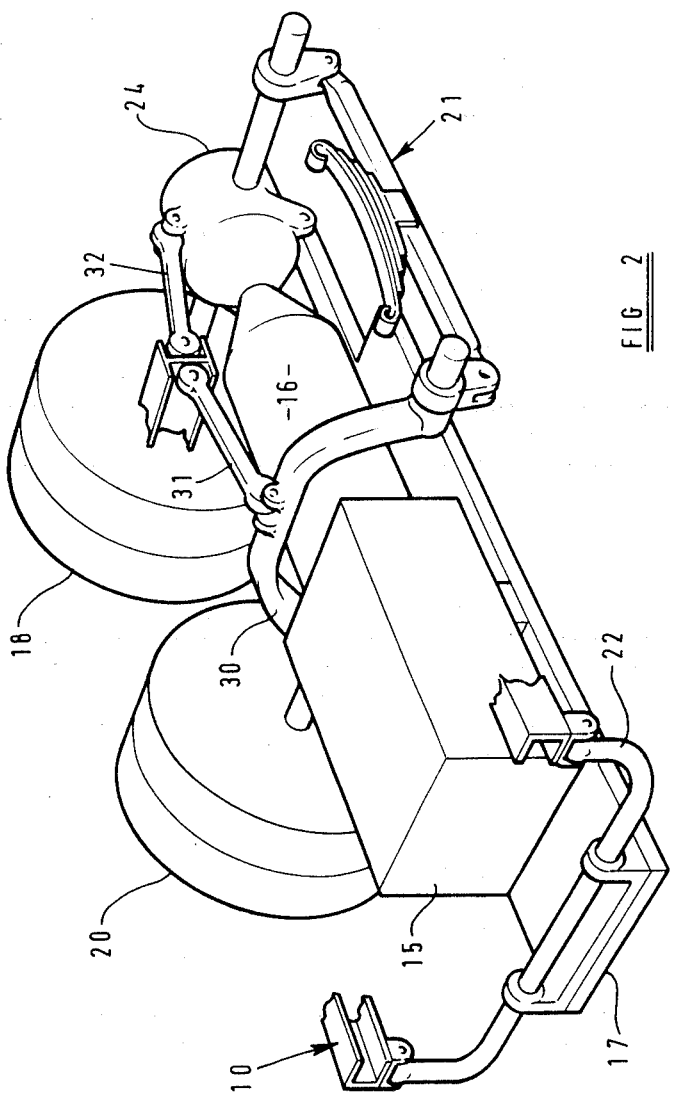
FIG. 2 illustrates diagrammatically certain parts of the tractor.

The tractor illustrated in FIGS. 1 and 2 comprises a chassis 10 which extends from one end of the tractor to the other. A cab 11 is mounted on the chassis adjacent to a front end thereof and a set of steerable front wheels 12 is mounted on the chassis beneath the cab. A fifth wheel coupling assembly 13 is mounted on the chassis 10 at a position between the cab and a rear end of the chassis. These parts may be constructed and arranged in a known manner.

The tractor also includes an assembly 14 comprising an engine 15 and a gearbox 16.

The assembly 14 preferably includes also a substantially rigid sub-frame 17, on which the engine and the gearbox are mounted. The engine and gearbox may constitute a single unit mounted on the sub-frame. Alternatively, this unit may be adopted to be supported directly on other components of the vehicle, without use of a structurally separate sub-frame.

The tractor also comprises a set of driven wheels 18 having a common axis of rotation 19 and a further set of rear wheels 20. Each of these sets may comprise two or four wheels. The wheels 18 and 20 are disposed beneath the chassis 10 and are connected with the chassis by suspension means 21 which transmits downwardly directed force from the chassis to respective axles associated with the sets of wheels. The suspension means includes one or more springs which may be arranged in a known manner. Conveniently, the suspension means and the wheels 18 and 20 are incorporated in a bogie in a known manner.

The assembly 14 is so connected with the chassis 10 that, when the axis 19 moves upwardly and downwardly relative to the chassis under the control of the suspension means 21, the engine 15 also necessarily moves upwardly and downwardly relative to the chassis. The engine participates in movement of the axis 19 upwardly and downwardly relative to the chassis but, in the particular arrangement illustrated, does not move through the same distance relative to the chassis as does the axis 19. The movement of the engine which accompanies a particular movement of the axis 19 is somewhat less than the movement of the axis.

The assembly 14 is connected with the chassis at the rear end of the sub-frame and adjacent to the front end of the sub-frame. The connection at the rear end of the sub-frame is provided by means which includes a link 22 suspended from the chassis 10 for pivoting relative thereto about a horizontal pivot axis 23 adjacent to the rear end of the chassis. The sub-frame 17 is connected with the link 22 at a position below the pivot axis 23 and in a manner which accommodates pivoting of the sub-frame relative to the link about a further axis parallel to the axis 23.

The link 22 is connected with the chassis 10 at two positions which are spaced apart transversely of the chassis. The link is thereby restrained against pivoting relative to the chassis about a longitudinal axis of the chassis. The connection between the link 22 and the sub-frame 17 also is arranged to restrain relative pivoting about a longitudinal axis of the chassis. Thus, the link may be connected with the sub-frame also at two positions which are spaced apart laterally of the chassis. Alternatively, an elongated bush or bearing may be employed in the connection between the link 22 and the sub-frame 17, the length of the bush or bearing extending in a direction transverse to the length of the chassis. The connections between the chassis and the link 22 and the connection between the sub-frame and the link 22 may incorporate respective elastomeric bushes arranged in a known manner. It will be seen that the engine and sub-frame are suspended by means of the link 22 from the chassis at a position on the chassis which is substantially at the rear end of the engine and that the link 22 is disposed substantially at the rear end of the engine. In the example illustrated, the link 22 comprises substantially vertical parts adjacent to opposite sides of the chassis and a transverse, horizontal bar extending between these parts. The sub-frame 17 is conveniently rectangular, as viewed in plan.

Adjacent to the front end of the sub-frame 17, the sub-frame is connected with an axle casing 24 associated with the driven wheels 18. The connection provides for relative pivoting about a horizontal axis 25. The axle casing 24 is connected with the chassis 10 in a known manner via the suspension means 21.

The load borne by the sub-frame 17, that is primarily the weight of the engine 15 and gearbox 16, is transmitted partly to the axle casing 24 adjacent to the axis 25 and is transmitted partly to the wheels 18 and 20 via the link 22, chassis 10 and suspension means 21.

The driven axle casing 24 incorporates a differential housing containing a differential gear arranged in a known manner. The connection which defines the axis 25 may be on the longitudinal centerline of the tractor and incorporate a bracket or lugs depending from the differential housing. The means defining this connection has a relatively small extent in a direction laterally of the chassis and incorporates an elastomeric bush arranged in a known manner so that limited pivotal movement of the sub-frame 17 relative to the axle casing 24 about a longitudinal axis of the tractor can occur. With this arrangement, the driven axle can rock laterally relative to the engine.

The engine 15 and gearbox 16 are preferably mounted on the sub-frame 17 by means of resilient engine mounts (not shown) of a known kind. A drive shaft 26 extends from the gearbox in a direction away from the engine 15 to a universal joint 27, by means of which the drive shaft is coupled with an input shaft carried by the axle casing 24. The universal joint 27 accommodates movement of the engine on its resilient mounts relative to the axle casing. It will be understood that any such movement will be small. There is no direct connection between the sub-frame 17 and an axle on which the wheels 20 are mounted. These wheels can move up and down relative to the axis 19 independently of the sub-frame and engine.

The wheels 20 are mounted on a rear axle 30 which is formed as an arch and extends over the engine-gear box unit 15 between the wheels 20. There is pivotally connected to the upper part of the axle 30 a link 31 which extends forwardly to a pivotal connection with the chassis 10. A further link 32 extends rearwardly from the differential housing of the driven axle 24 to a further pivotal connection with the chassis 10.

It will be noted that the engine 15 lies partly between the wheels 20 and lies partly to the rear of those wheels. The engine is spaced rearwardly from the driven axle 24 and the gearbox 16 lies between the respective axes of the wheels 18 and 20.

The axis 25 is sufficiently close to the axis 19 for the relation between the engine 15 and the axis 19 to remain substantially constant during use of the vehicle, when the axis 19 moves upwardly and downwardly relative to the chassis 10 through the limited range of movement permitted by the suspension 21 while the rear end of the sub-frame 17 is maintained at a substantially constant distance below chassis by the link 22.

Figure 3:
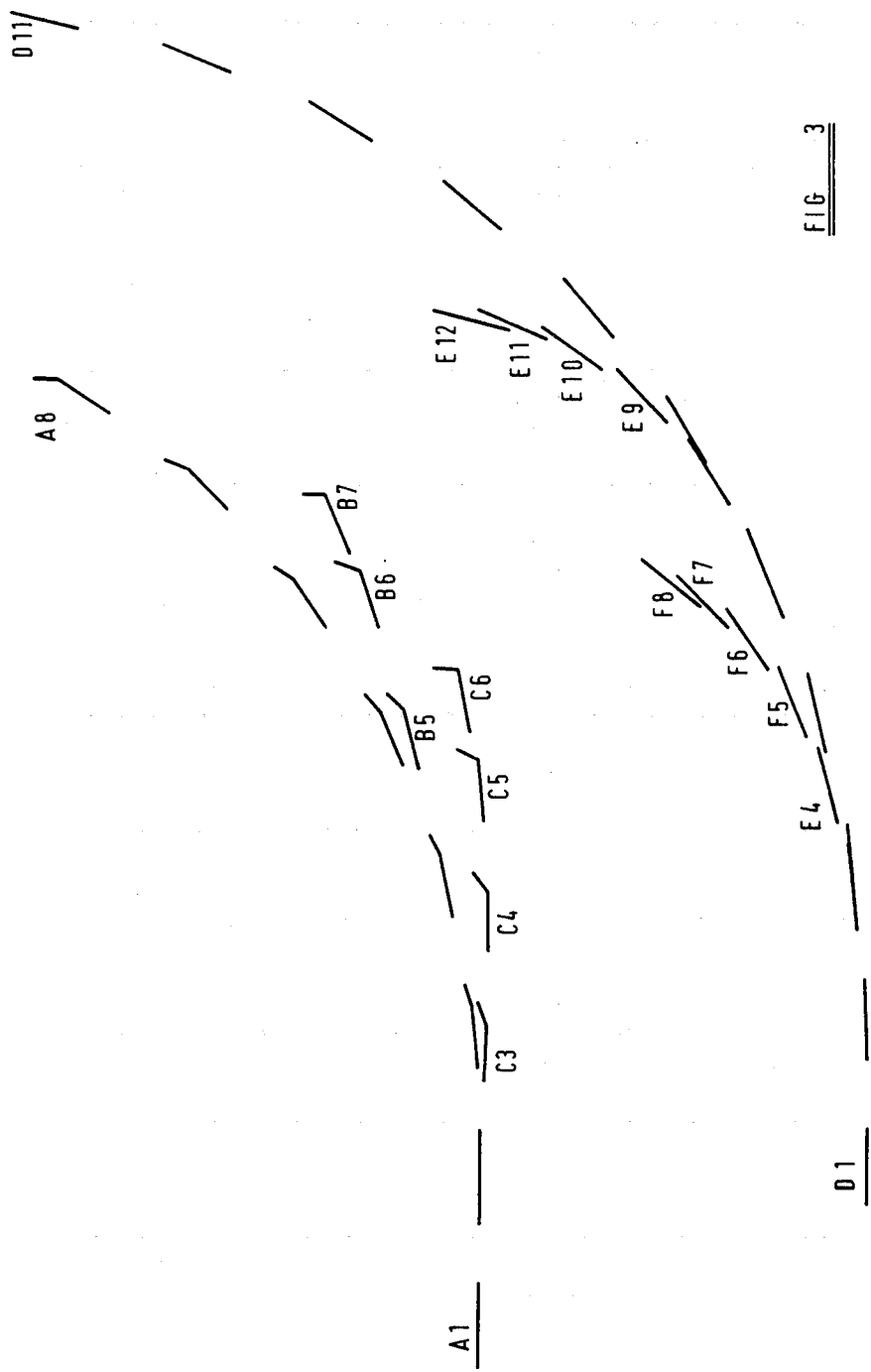
FIG. 3 is a diagram illustrating the attitude of a tractor relative to a semi-trailer of a conventional articulated vehicle and of a vehicle in accordance with the present invention under various conditions.

The beneficial effect of the arrangement illustrated in the drawings, as compared with a conventional articulated vehicle, is shown in FIG. 3 where successive positions of a conventional articulated vehicle, as viewed in plan, are shown at a $A_1$ to $A_8$. FIG. 3 is drawn to a scale of one inch representing fifty feet. At position $A_1$, the vehicle is travelling at a speed of thirty five miles per hour and this speed is maintained through to position $A_8$. The vehicle bears no load, the vehicle brakes remain off throughout movement from position $A_1$ to position $A_8$. As the vehicle moves into position $A_1$, left lock of three degress thirty four minutes is applied to the steerable wheels of the tractor unit. As shown, the vehicle begins to jack-knife almost immediately after diverging from the straight line path of travel along which the vehicle has moved before reaching position $A_1$.

At $D_1$ to $D_{11}$, there is represented to the same scale successive positions of an articulated vehicle having a tractor unit as shown in FIGS. 1 and 2 hereof. This vehicle approaches position $D_1$ along a straightline path at a speed of 35 mph and this speed is maintained to position $D_{11}$. The vehicle brakes are not applied during travel from position $D_1$ to position $D_{11}$ and the vehicle is unladen. As the vehicle enters position $D_1$, left lock of 3° 34 minutes is applied to the steerable wheels. It will be noted that the vehicle having a tractor as shown in FIGS. 1 and 2 of the accompanying drawings does not tend to jack-knife at any stage of movement from position $D_1$ to $D_{11}$. Furthermore, the radius of curvature of the path along which the vehicle moves between these positions is substantially constant whereas the radius of curvature of the path along which the conventional vehicle moves from position $A_1$ to position $A_8$ decreases progressively, owing to the jack-knifing of the vehicle which gives rise to a pronounced oversteer effect.

At $B_5$, $B_6$ and $B_7$ in FIG. 3 there are shown successive positions of the conventional vehicle represented at positions $A_1$ to $A_8$ after the vehicle has approached position $A_1$ travelling in a straight line at 35 mph, had 3° 34 minutes of left steering lock applied at position $A_1$, has continued at 35 mph with the brakes off for a period of 2.6 seconds and the brakes of which have been applied 2.6 seconds after the vehicle passed through position $A_1$ just sufficiently to lock the rear wheels of the tractor. As shown in FIG. 3, application of the brakes causes the jack-knifing to be more severe than the jack-knifing which occurs without braking and the vehicle diverges from the path followed by the vehicle when moving from position $A_1$ to $A_8$.

At $E_4$ and $E_9$ to $E_{12}$ in FIG. 3, there is represented positions through which there passes a vehicle having a tractor as shown in FIGS. 1 and 2 of the accompanying drawings which approaches position $D_1$ in a straight line at a speed of 35 mph, has 3° 34 minutes of left steering lock applied at position $D_1$, continues at a speed of 35 mph without braking for a period of 2.6 seconds and then has the brakes applied just sufficiently to lock the rear wheels of the tractor. As shown in FIG. 3, the vehicle does not jack-knife and, until the vehicle has reached position $E_{10}$ where the speed is low, as compared with 35 mph, the vehicles does not diverge considerably from the path followed by the unbraked vehicle moving from position $D_1$ to position $D_{11}$.

There is represented in FIG. 3 at positions $C_3$ to $C_6$ the path of the conventional vehicle when it has travelled along a straight line at 35 mph to position $A_1$ and, at that position, 3° 34 minutes of left steering lock have been applied and, 0.1 seconds after passing through position $A_1$, the brakes have been applied just sufficiently to lock the rear wheels of the tractor.

As shown, severe jack-knifing occurs and the vehicle continues along an approximately straight line path of travel, notwithstanding the application of the same steering lock as was applied to the vehicle when travelling from position to $A_1$ to position $A_8$. As is shown in FIG. 3, the vehicle cannot be steered after the brakes have been applied sufficiently to lock the rear wheels of the tractor.

At $F_5$ to $F_8$ in FIG. 3, there is shown successive positions through which the vehicle having the tractor unit shown in FIGS. 1 and 2 moves after having approached position $D_1$ along a straight line path at a speed of 35 mph, having 3° 34 minutes of left steering lock applied at position $D_1$ and having the brakes applied just sufficiently to lock the rear wheels of the tractor 0.1 seconds after passing through position $D_1$. It will be seen that jack-knifing of the vehicle does not occur and that the vehicle diverges smoothly from the straight line path, the radius of curvature of the path of travel depending upon the amount of steering lock maintained, although being smaller than the radius maintained with the same steering lock when the vehicle travels unbraked from position $D_1$ to position $D_{11}$. Clearly, the vehicle having a tractor unit as shown in FIGS. 1 and 2 can be steered under braking and remains under control; whereas the conventional vehicle cannot be controlled under braking which locks the rear wheels of the tractor.

I claim:

1. An articulated, freight-carrying road vehicle comprising a tractor and a semi-trailer, wherein the tractor has a chassis, steerable front wheels mounted on the chassis, first and second sets of rear wheels mounted for rotation about respective axes which are spaced apart along the chassis, an engine, transmission means for transmitting drive from the engine to at least the wheels of said first set, suspension means for transmitting a downwardly directed load from the chassis to the wheels of said sets while permitting limited upward and downward movement of said axes relative to the chassis and a fifth wheel coupling assembly on the chassis, wherein the engine is disposed partly between the wheels of said second set, the engine is spaced rearwardly from the axis of the wheels of said first set, there is provided support means for supporting the weight of the engine at two only positions spaced longitudinally of the tractor, said support means comprising support pivot means at a rear end of the engine for connecting the engine with the chassis at a position to the rear of the engine and in a manner to permit limited upward and downward movement of a front end of the engine relative to the chassis while restraining upward and downward movement of the rear end of the engine relative to the chassis and a further support at a position between the wheels of said first set for so connecting the engine with wheels of the first set that a substantially fixed relation is maintained between the engine and the axis of the wheels of the first set.

2. An articulated, freight-carrying road vehicle comprising a tractor and a semi-trailer, wherein the tractor has a chassis, steerable front wheels mounted on the chassis, first and second sets of rear wheels mounted for rotation about respective axes which are spaced apart along the chassis, an engine, transmission means for transmitting drive from the engine to at least the wheels of said first set, suspension means for transmitting a downwardly directed load from the chassis to the wheels of said sets while permitting limited upward and downward movement of said axes relative to the chassis and fifth wheel coupling assembly on the chassis, wherein the engine is disposed partly between the wheels of said second set, the engine is spaced rearwardly from the axis of the wheels of said first set, there is provided at a rear end of the engine means for connecting the engine with the chassis at a position to the rear of the engine and in a manner tó permit limtied upward and downward movement of a front end of the engine relative to the chassis while restraining upward and downward movement of the rear end of the engine relative to the chassis and means is provided for so connecting the engine with wheels of the first set that a substantially fixed relation is maintained between the engine and the axis of the wheels of the first set, wherein the transmission means includes a gearbox incorporated in a rigid unit with the engine and wherein the tractor further comprises a rear axle formed as an arch and extending over said unit between wheels of the second set.

3. An articulated, freight-carrying road vehicle comprising a tractor and a semi-trailer, wherein the tractor has a chassis, steerable front wheels mounted on the chassis, first and second sets of rear wheels mounted for rotation about respective axes which are spaced apart along the chassis, an engine, transmission means for transmitting drive from the engine to at least the wheels of said first set, suspension means for transmitting a downwardly directed load from the chassis to the wheels of said sets while permitting limited upward and downward movement of said axes relative to the chassis and a fifth wheel coupling assembly on the chassis, wherein the engine is disposed partly between the wheels of said second set, the engine is spaced rearwardly from the axis of the wheels of said first set, there is provided at a rear end of the engine a pivoted link for connecting the engine with the chassis at a position to the rear of the engine and in a manner to permit limited upward and downward movement of a front end of the engine relative to the chassis while restraining upward and downward movement of the rear end of the engine relative to the chassis and means is provided for so connecting the engine with wheels of the first set that a substantially fixed relation is maintained between the engine and the axis of the wheels of the first set.

* * * * *